O. M. OTTE.
RESILIENT HOLDING CLIP.
APPLICATION FILED JULY 17, 1916.
1,222,453.
Patented Apr. 10, 1917.
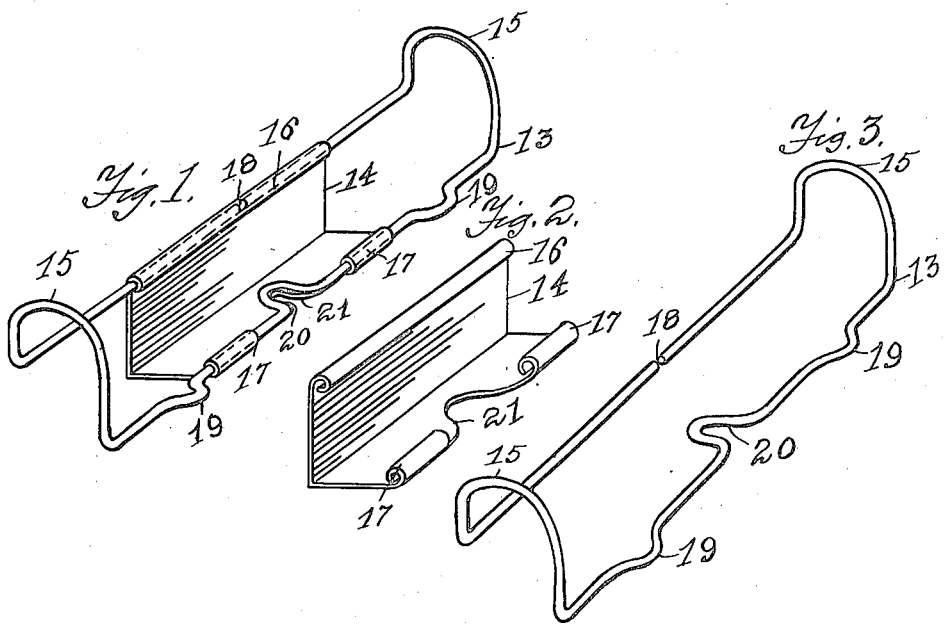
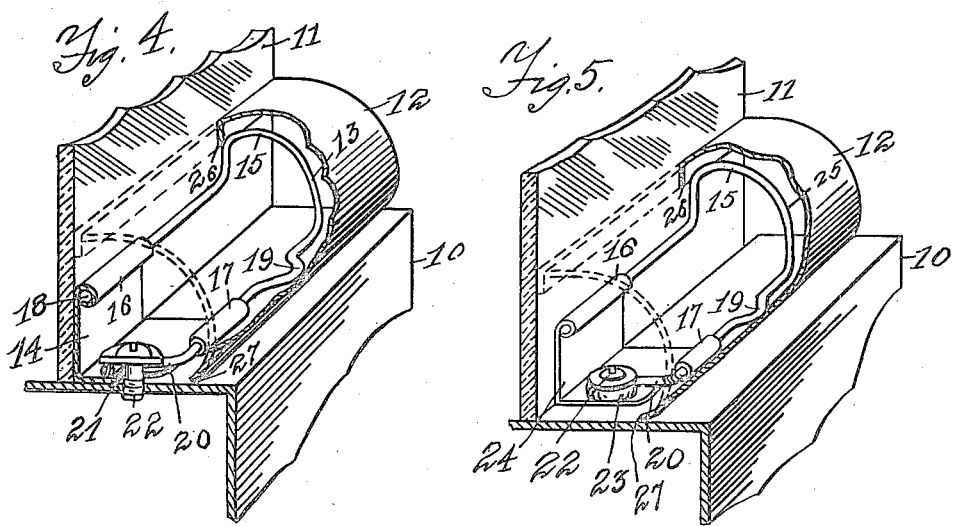
Witnesses
Ivar E. Nordstrom
H. O. Sandberg
Inventor
Otho M. Otte.
By S. Arthur Baldwin
Attorney

UNITED STATES PATENT OFFICE.

OTHO M. OTTE, OF JAMESTOWN, NEW YORK.

RESILIENT HOLDING-CLIP.

1,222,453.

Specification of Letters Patent.

Patented Apr. 10, 1917.

Application filed July 17, 1916. Serial No. 109,644.

*To all whom it may concern:*

Be it known that I, OTHO M. OTTE, a citizen of the United States, residing at the city of Jamestown, in the county of Chautauqua and State of New York, have invented certain new and useful Improvements in Resilient Holding-Clips, of which the following, taken in connection with the accompanying drawings, is a specification.

The invention relates to holding devices for hollow sheet metal molding and similar constructions; and the object of the improvement is to provide a combination wire and sheet metal holding or attaching clip over which the hollow sheet metal molding may be sprung into holding engagement therewith, yet easily removable therefrom, the construction of the wire and sheet metal holding portions being so arranged that the molding is held by the torsional strain or spring of the wire; and the invention consists in the novel features and combinations hereinafter set forth and claimed.

In the drawings, Figure 1 is a perspective view of the holding clip showing the construction and arrangement of the same. Fig. 2 is a perspective view of the sheet metal portion of the holding clip; and Fig. 3 is a perspective view of the wire portion of the holding clip detached from the sheet metal portion. Fig. 4 is a central sectional view of Fig. 1 showing a portion of a plate of glass and the sheet metal stile therefor, the glass being held in place on the stile on one side by means of hollow sheet metal molding and the molding held in place by the combination wire and sheet metal spring clip. Fig. 5 is a similar view of the glass, stile and molding to that shown in Fig. 4, showing a modification of the holding clip with a single spring end, as though the full double ended holding clip were centrally divided.

Like characters of reference refer to corresponding parts in the several views.

The numeral 10 designates the hollow sheet metal door or window stile, and the numeral 11 a portion of a plate of glass or panel upheld by said stile 10.

The glass 11 is removably attached to the sheet metal stile 10 by means of a hollow sheet metal molding 12 which is removably held in place in the angle between the stile 10 and the glass 11 by means of the spring holding clip which comprises the wire portion 13 and the sheet metal portion 14, which wire has the upwardly bent spring end or ends 15.

The sheet metal portion 14 which holds the wire part 13 firmly in position is bent in the angular form to fit the angle between the glass or panel 11 and the stile 10 and has the lengthwise turned tubular edge 16 into which the opposite ends 18 of the wire are inserted. The other edge of the sheet metal holding plate 14 has the lugs 17 which are turned around the wire 13 to hold it firmly in position in its central attachment to the plate 14 and to the stile 10.

The wire 13 is bent outwardly and upward at 19 each side of the attachments 17 to receive one edge of the molding 12 therebeneath. The plate 14 has the central notch 21 therein and the wire 13 has the inturned bend 20 corresponding to the notch 21 to receive therein the attaching screw 22 for the attachment of the holding clip to the stile 10. The holding screw 22 preferably has a washer which fits over the return bend 20 in the wire 13.

The modified form of the holding clip shown in Fig. 5 comprises substantially one-half of the holding clip shown in Fig. 1, the end 23 of the wire 25 being turned in a loop to receive the attaching screw 22, the holding plate 24 having a tubular turned edge 16 to receive the other end of the wire 25, and a lug 17 is turned around the wire 25 in the same form shown in the full double holding clip.

It is now apparent that the edge 27 of the molding 12 can be inserted beneath the bends 19 in the wire 13, and the other edge 26 sprung over the upturned end or ends 15 into holding engagement therewith, the torsional strain on the wires 13 or 25 from the bends 19 and 15 firmly holding the molding 12 without danger of its being jarred or otherwise detached from the clip.

I claim as new:

1. A clip for moldings, including a member having a base and a web the outer sides of each of which are bent to form eyes, said base having a central cut-out, a wire element having longitudinal parts engaged in the respective eyes, and transverse parts connecting the longitudinal parts, the longitudinal part of the wire adjacent the base having a central inward bend in register with said cut-out and having outward molding engaging bends on opposite sides of the central bend, a screw extending through said cut-out and central bend, and molding engaging bends formed on the transverse parts of the wire.

2. A clip for moldings including a sheet metal member, and a wire element formed independently of the member, said wire element being bent to form molding engaging grips, and means to secure said element to said member to allow said element with its grips to yield.

3. A clip for moldings including a supporting member, and a wire member formed independently of the supporting member and bent to form molding engaging parts, and means to secure the wire member to the supporting member to yieldingly support the molding engaging parts.

4. A clip for moldings including a right-angled support, a wire member having an upper part connected at one end to the top of the support and having a lower part connected at one end to the bottom of the support, said member having a part connecting the opposite ends of said upper and lower parts thereof, and molding engaging grips formed on said wire member.

5. In a molding clip, a supporting member, a strand of wire bent in the form of a loop, and means to secure the wire loop to said member, said loop being bent to form yieldable molding engaging grips.

6. In a molding clip, a right-angled metal plate having its side edges curled to form eyes, and a strand of wire bent to form substantially parallel parts which latter are engaged in said eyes, and grips formed integral with the wire and projecting out from said parts thereof.

7. In a molding clip, a strand of wire bent to form a lower molding engaging grip and to form an upper molding engaging grip, said grips being arranged at substantially right angles to one another, and means to secure the wire in position to allow of yielding of said grips.

In testimony whereof I have affixed my signature in the presence of two witnesses.

OTHO M. OTTE.

Witnesses:
H. A. SANDBERG,
IVAR E. NORDSTROM.